United States Patent
Ridderbusch

(10) Patent No.: US 8,656,879 B2
(45) Date of Patent: Feb. 25, 2014

(54) LASER DEVICE AND OPERATING METHOD FOR IT

(75) Inventor: Heiko Ridderbusch, Schwieberdingen (DE)

(73) Assignee: Robert Bosch GmbH, Stuttgart (DE)

(*) Notice: Subject to any disclaimer, the term of this patent is extended or adjusted under 35 U.S.C. 154(b) by 634 days.

(21) Appl. No.: 12/736,514

(22) PCT Filed: Mar. 19, 2009

(86) PCT No.: PCT/EP2009/053225
§ 371 (c)(1),
(2), (4) Date: Dec. 29, 2010

(87) PCT Pub. No.: WO2009/127490
PCT Pub. Date: Oct. 22, 2009

(65) Prior Publication Data
US 2011/0259291 A1 Oct. 27, 2011

(30) Foreign Application Priority Data
Apr. 17, 2008 (DE) .......................... 10 2008 001 239

(51) Int. Cl.
*F02P 23/04* (2006.01)
(52) U.S. Cl.
USPC ............................. 123/143 B; 372/11; 372/64
(58) Field of Classification Search
USPC .................................... 123/143 B; 372/11, 64
See application file for complete search history.

(56) References Cited

U.S. PATENT DOCUMENTS

| | | | |
|---|---|---|---|
| 6,263,004 B1* | 7/2001 | Arvidsson et al. | 372/11 |
| 6,413,077 B1* | 7/2002 | Early et al. | 431/1 |
| 6,514,069 B1* | 2/2003 | Early et al. | 431/1 |
| 6,608,854 B1* | 8/2003 | Watanabe | 372/96 |
| 6,676,402 B1* | 1/2004 | Early et al. | 431/1 |
| 6,813,285 B2* | 11/2004 | Peterson | 372/10 |
| 6,842,466 B1* | 1/2005 | Tam et al. | 372/25 |
| 7,661,401 B2* | 2/2010 | Anezaki et al. | 123/143 B |
| 7,672,346 B1* | 3/2010 | Bass et al. | 372/34 |
| 7,843,978 B2* | 11/2010 | Souhaite et al. | 372/33 |
| 8,312,854 B2* | 11/2012 | Weinrotter et al. | 123/143 B |
| 8,355,415 B2* | 1/2013 | Herden et al. | 372/10 |
| 2003/0138005 A1 | 7/2003 | Kan et al. | |
| 2006/0243238 A1* | 11/2006 | Anezaki et al. | 123/143 B |
| 2010/0018487 A1 | 1/2010 | Herden et al. | |
| 2010/0218739 A1 | 9/2010 | Herden et al. | |

FOREIGN PATENT DOCUMENTS

| | | |
|---|---|---|
| DE | 10 2006 030 722 | 1/2008 |
| DE | 10 2006 031 768 | 1/2008 |
| WO | WO 97/31411 | 8/1997 |
| WO | WO 2008/022914 | 2/2008 |

* cited by examiner

*Primary Examiner* — Erick Solis
(74) *Attorney, Agent, or Firm* — Kenyon & Kenyon LLP

(57) ABSTRACT

In a method for operating a laser device, which has a laser-active solid having a passive Q-switch, the laser device is acted upon using pumping light in such a way that a specifiable curve over time of the inversion density comes about in the laser-active solid, as a result of which an especially precise control of the time behavior is achieved during the generation of passively Q-switched laser pulses.

10 Claims, 3 Drawing Sheets

LASER DEVICE AND OPERATING METHOD FOR IT

BACKGROUND OF THE INVENTION

1. Field of the Invention

The present invention relates to a method for operating a laser device which has a laser-active solid that has passive Q-switching. The present invention also relates to a laser device having a laser-active solid, passive Q-switching and a pumping source to act upon the laser device using pumping light.

2. Description of Related Art

By contrast to actively Q-switched laser devices, in which the time of generating a Q-switched laser pulse is able to be specified in a simple way by a corresponding activation of the active Q-switching, the generation of a laser pulse at a desired point in time while using passively Q-switched systems is far more complex.

BRIEF SUMMARY OF THE INVENTION

It is accordingly an object of the present invention to improve a laser device, and an operating method of the type named at the outset, to the extent that a higher precision is made possible in the generation of the passively Q-switched laser pulses with respect to the occurrence in time of the laser pulses.

This object is attained, according to the present invention, in the case of the operating method of the type mentioned at the outset, by acting on the laser device using pumping light in such a way that a specifiable curve over time of the inversion density comes about in the laser-active solid. According to the present invention, it has been recognized that not only an absolute value of the inversion density, brought about in the laser-active solid by the action of the pumping light, has an influence on the generation of a passively Q-switched laser pulse, but particularly also the curve over time of the inversion density. Accordingly, it becomes advantageously possible, because of the method of the present invention, to achieve a desired inversion density in the laser-active solid, and with that, a desired operating behavior of the laser device, by way of a specifiable pumping light action of the laser device. In particular, because of this, the precision compared to usual methods is able to be increased with respect to the point in time at which the Q-switched laser pulse is emitted.

One particularly simple example embodiment, of the operating method according to the present invention, provides that the laser device be acted upon at least at times with pumping light of a constant power density. An additional increase in precision during the operation of the laser device comes about, according to the present invention, when the power density of the pumping light is selected so that a first Q-switched laser pulse, starting from a pumping start time, which corresponds to the beginning of the action by the pumping light, is generated within a pumping duration that is less than, or equal to approximately twice the fluorescence life of a material of the laser-active solid.

The selection, according to the present invention, of the power density of the pumping light may take place, for example, by way of a control method in which the power density of successive pumping processes is first varied until the desired pumping duration is reached that is of the order of magnitude of twice the fluorescence life or less. Besides the fluorescence life of the laser-active materials used, there exist further factors such as the optical configuration of the laser device, the type of the coupling of the pumping light into the laser device or the laser-active solid and the like, so that the optimal pumping duration or a power density required for this is able to be ascertained for a given configuration, for instance, within the scope of an application process. According to the present invention, a variance in time of the pumping duration between the pumping start time and the actual generation of the passively Q-switched laser pulse is particularly small when the pumping duration is less than, or equal to approximately twice the fluorescence life of the material of the laser-active solid. An even smaller variance of the pumping duration, and consequently a further increased precision, comes about, according to the present invention, if the power density of the pumping light is selected so that the pumping duration up to the generation of the laser pulse lies within the range of the simple fluorescence life of the laser-active material. This means that, according to the present invention, the power density of the pumping light is to be selected to be sufficiently great to achieve a pumping duration in the range of the single to double fluorescence life, and thus a low variance in the pumping duration.

In usual laser materials such as Nd:YAG, according to the present invention, the pumping duration is to be selected accordingly between about 250 s and 500 s.

In one further very advantageous example embodiment of the method according to the present invention, it is provided that one should apply to the laser device, at least at times, a pumping light of a nonconstant power density and one should select the power density of the pumping light in such a way that, at least at times, a specifiable change over time comes about of the inversion density in the laser-active solid. This brings about an additional degree of freedom which, for example, directly after the pumping start time, first makes possible an optical pumping having a relatively low power density of the pumping light, and therefore a more protective operation of the pumping light source. In order, nevertheless, to obtain an increased precision with respect to the occurrence in time of the passively Q-switched laser pulse, it is advantageously provided, according to the present invention, at least at times, and particularly directly before the generation of the passively Q-switched laser pulses, that one maintain a specifiable change over time of the inversion density in the laser-active solid.

For this, it may advantageously be provided, according to the present invention, that the change over time of the inversion density in the laser-active solid not fall below a specifiable threshold value, preferably directly before the generation of the first Q-switched laser pulse. It has been observed, according to the present invention, that the variance over time of a pumping duration, measured from the pumping start time to the generation of the passively Q-switched laser pulse, is at a minimum if the change over time of the inversion density corresponds to the criteria mentioned above.

As an approximate value for the specifiable threshold value of the change over time of the inversion density, one may, for instance, use that gradient of the inversion density which sets in when a constant power density of the pumping light is selected in such a way that a pumping duration up to the generation of a laser pulse is less than, or approximately equal to twice the fluorescence life of the material of the laser-active solid.

A precision, remaining equally high over the entire operating duration of the laser device, comes about as the result of an additional advantageous specific embodiment of the operating method according to the present invention, if a plurality of Q-switched laser pulses is generated, for the plurality of laser pulses, in each case a pumping duration is ascertained between a pumping start time, which corresponds to the beginning of the application using the pumping light, and the time of the actual generation of the respective laser pulse, and if deviations in the pumping duration of different laser pulses are evaluated, so as to change the application of pumping light onto the laser device. In particular, as a function of the pumping durations ascertained by the abovementioned analysis or their variance, a power of the pumping light to be used in the future is able to be ascertained, or even a change over time of the inversion density.

When using a pumping light source having one or more semiconductor laser diodes, the desired power density of the pumping light is able to be set particularly easily by specifying a corresponding current through the semiconductor laser diodes.

The operating method according to the present invention is especially suitable for generating laser pulses for an ignition device of an internal combustion engine, particularly of a motor vehicle. Furthermore, the laser device according to the present invention may also be used in ignition devices of stationary engines, especially high capacity gas engines.

DETAILED DESCRIPTION OF THE INVENTION

Figure 1:
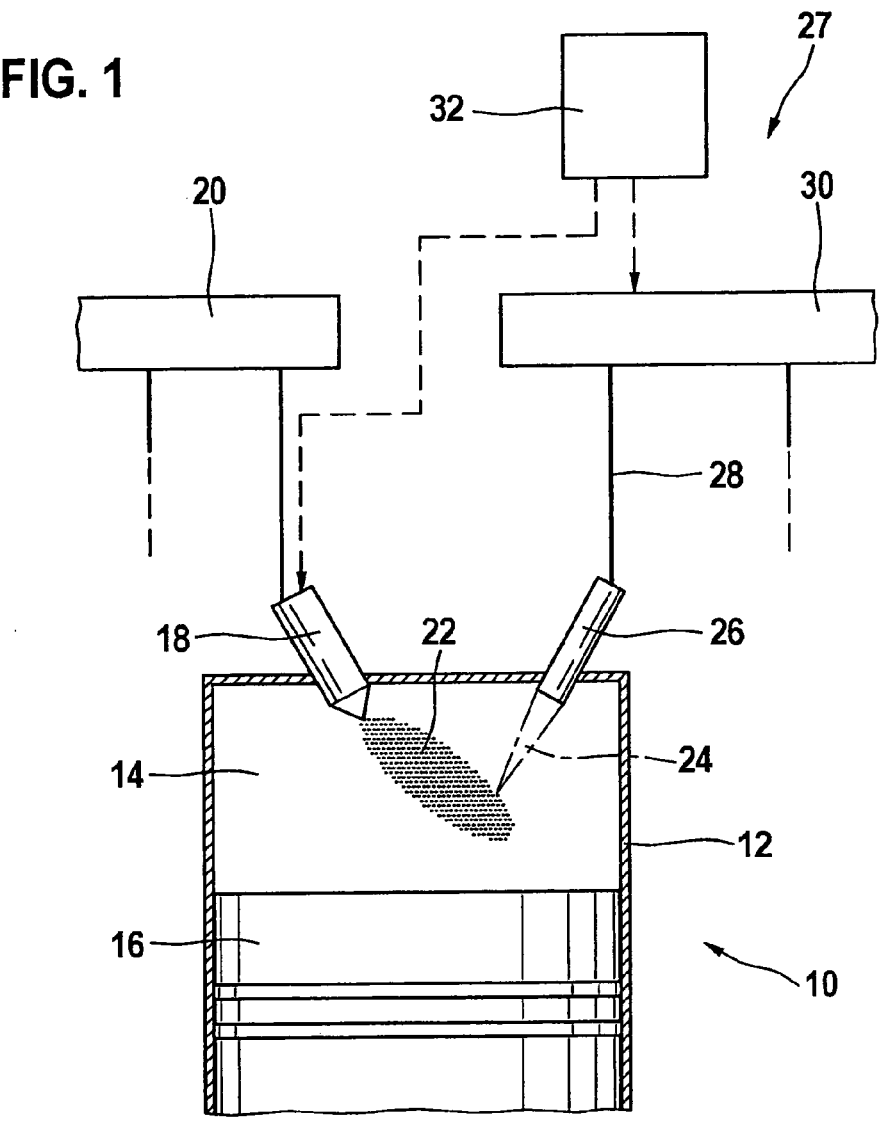
FIG. 1 shows a schematic representation of an internal combustion engine having a laser-based ignition device for use with the method according to the present invention.

In FIG. 1, an internal combustion engine is denoted overall by reference numeral 10. It is used for driving a motor vehicle that is not shown. Internal combustion engine 10 includes a plurality of cylinders, only one of which is shown in FIG. 1 and denoted by reference numeral 12. A combustion chamber 14 of cylinder 12 is bounded by a piston 16. Fuel reaches combustion chamber 14 directly through an injector 18, which is connected to a fuel pressure reservoir 20 that is also designated as a rail, or rather, common rail.

Fuel 22 injected into combustion chamber 14 is ignited using a laser pulse 24, which is eradiated into combustion chamber 14 by an ignition device 27 which includes a laser device 26. For this purpose, laser device 26 is fed, via a light-guide device 28, with pumped light provided by a pumping light source 30. Pumping light source 30 is controlled by a control and regulating device 32, which also activates injector 18.

Pumping light source 30 preferably has at least one semiconductor laser diode which, as a function of a control current, emits pumping light of appropriate power density via light guide device 28 to laser device 26. Although semiconductor laser diodes, and other pumping light sources that take up little space, are preferred for use in the motor vehicle field, for the purpose of operating ignition device 27 according to the present invention, every type of pumping light source is usable, in principle, in which the power density of the pumping light, by which the laser device 26 is acted upon, is able to be set.

Figure 2:
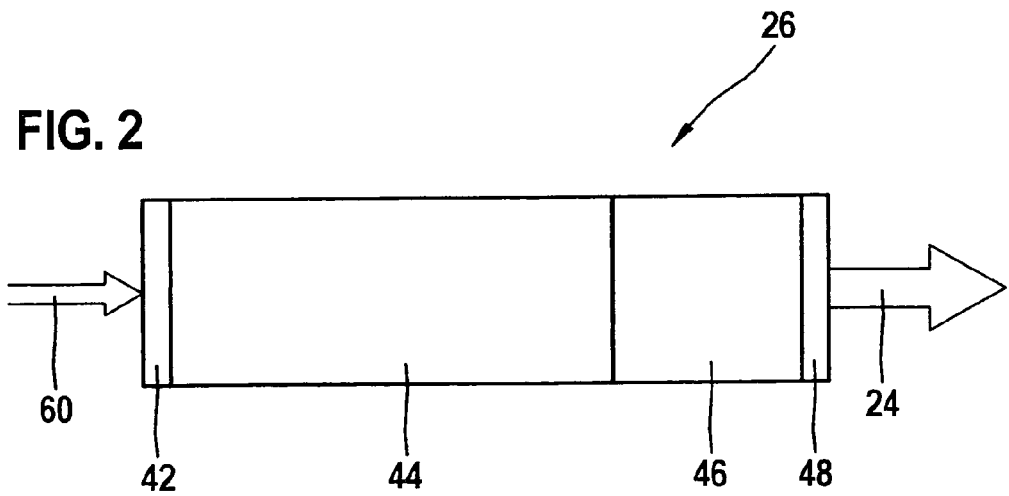
FIG. 2 shows an example embodiment of the laser device according to the present invention in detail.

FIG. 2 shows schematically a detailed view of laser device 26 from FIG. 1.

As may be seen in FIG. 2, laser device 26 has a laser-active solid 44 which has optically postconnected to it passive Q-switching 46 that is also designated as a Q-switch. Laser-active solid 44, together with passive Q-switch 46, as well as coupling mirror 42 situated to the left of laser-active solid 44 in FIG. 2, and output mirror 48 form a laser oscillator, whose oscillating behavior depends on passive Q-switch 46, and that being the case, is at least indirectly controllable in a manner known per se.

In the configuration of laser device 26 illustrated in FIG. 2, pumping light 60 is guided through light guide device 28, that was described with reference to FIG. 1, from pumping light source 30 onto laser-active solid 44, which may be developed as a Nd:YAG system, for example.

Besides the abovementioned configuration illustrated in FIG. 2, that is to be longitudinally acted upon using pumping light 60, systems for transverse optical pumping or combinations of transverse and longitudinal optical pumps are also possible.

While passive Q-switch 46 is in its idle state, a saturatable absorber included in it manifests a comparatively low transmission coefficient, whereby a laser operation is avoided in laser-active solid 44, or rather, in solid 44, 46 that is bordered by coupling mirror 42 and output mirror 48. However, with increasing pumping duration, the radiation density in laser-oscillator 42, 44, 46, 48 increases, so that passive Q-switch 46, or rather its saturatable absorber fades, that is, takes on a greater transmission coefficient, and the laser operation is able to begin.

In this way, a laser pulse 24 is created that is also designated as a giant pulse, which has a relatively high peak power. Laser pulse 24 is coupled into combustion chamber 14 (FIG. 1) of internal combustion engine 10, if necessary, using an additional light guide device (not shown), or directly through a non-illustrated combustion chamber window of laser device 26 that is not shown, so that fuel 22 present there is ignited.

It is provided, according to the present invention, that pumping light 60 should be applied to laser device 26 in such a way that a specified curve over time of the inversion density comes about in laser-active solid 44. This means that the population inversion induced in laser-active solid 44 by the optical pumping with pumping light 60 is controlled, according to the present invention, by adjusting the power density of pumping light 60 in such a way that the inversion density, and especially also its curve over time, corresponds to specifiable conditions.

Figure 3:
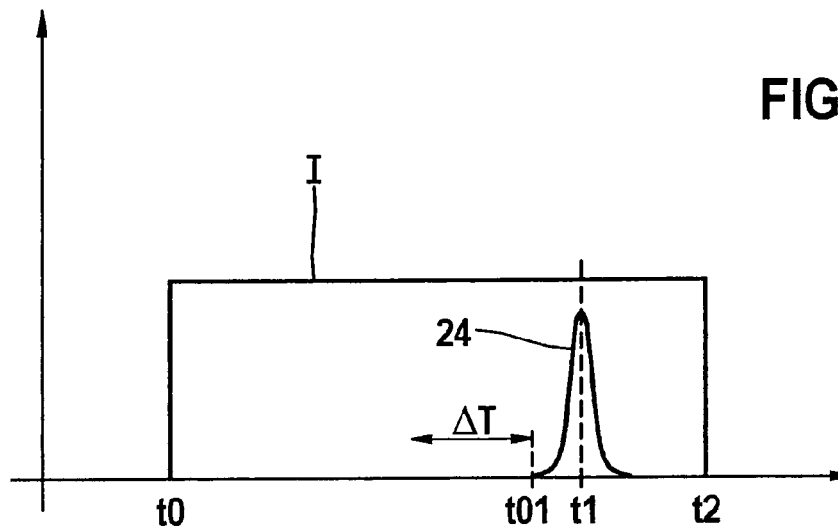
FIGS. 3 and 4 show the curve over time of operating variables of the laser device according to the present invention while using a first example embodiment of the method according to the present invention.

In a first example embodiment of the operating method according to the present invention it is provided that laser device 26 has pumping light 60 of a constant power density applied to it at least at times. To do this, for example, control device 32 (FIG. 1) controls a semiconductor laser diode, that is included in pumping light source 30, using a constant control current I, whose curve over time is shown in FIG. 3. As may be seen in FIG. 3, the pumping process begins at time t0, designated below also as pumping start time. After a sufficiently great pumping duration t1-t0, i.e. in the present case to time t1, a first passively Q-switched laser pulse 24 is generated by laser device 26. Finally, at time t2, the pumping process is ended by switching off control current I.

In order to keep as low as possible the variance between time t1 of the actual generation of passively Q-switched laser pulse 24 and pumping start time t0, that is, the variance of pumping duration t1-t0, it is provided according to the present invention that one select the power density of pumping light 60, especially before time t1, in such a way that a specifiable curve over time of inversion density ni (FIG. 4) comes about in laser-active solid 44 (FIG. 2).

According to the present invention, the power density of pumping light 60 is selected, in this case by setting control current I (FIG. 3) for the semiconductor laser diode, in such a way that the pumping duration t1-t0 is less than, or equal to approximately twice the fluorescence life of the Nd:YAG material of laser-active solid 44.

It has turned out, according to the present invention, that in the case of a power density thus selected, of pumping light 60, a particularly low variance of pumping duration t1-t0 exists between a plurality of laser pulses 24. Ignition time t1 is thereby advantageously able to be set very precisely in laser-based ignition device 27, shown in FIG. 1, so that combustion is able to take place at optimal efficiency, and so that in particular, engine damage that is caused by too early an ignition, etc., may be avoided.

Figure 4:
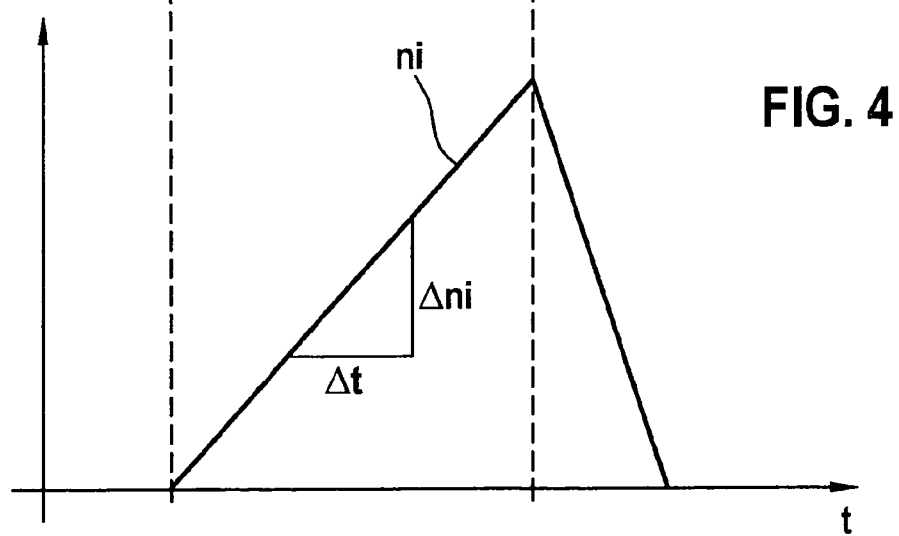

FIG. 4, as was described, depicts the curve over time of inversion density ni, as it sets in in laser-active material 44 while the latter is acted upon by pumping light 60 (FIG. 2) of pumping light source 30 (FIG. 1). Because of the action upon laser device 26 by pumping light 60 of constant power density, cf. constant control current I of FIG. 3, between pumping start time t0 and time t01 (FIG. 3), there comes about an approximately linear increase in inversion density ni, which is decreased again in a manner known per se with the generation of laser pulse 24 at time t1.

The change with time of inversion density ni in laser-active solid 44 is illustrated in FIG. 4 by slope triangle ni/t.

It has proven to be advantageous, according to the present invention, if the power density of pumping light 60, and with that also the curve over time of inversion density ni, is selected as a function of the fluorescence life of the material laser-active solid 44 preferably in such a way that pumping duration t1-t0 is smaller or equal to approximately twice the fluorescence life. This means that, as a function of the fluorescence life of laser-active material 44, among other things, the amplitude of control current I (FIG. 3) is selected for the optical pumping of laser device 26.

Figure 5:
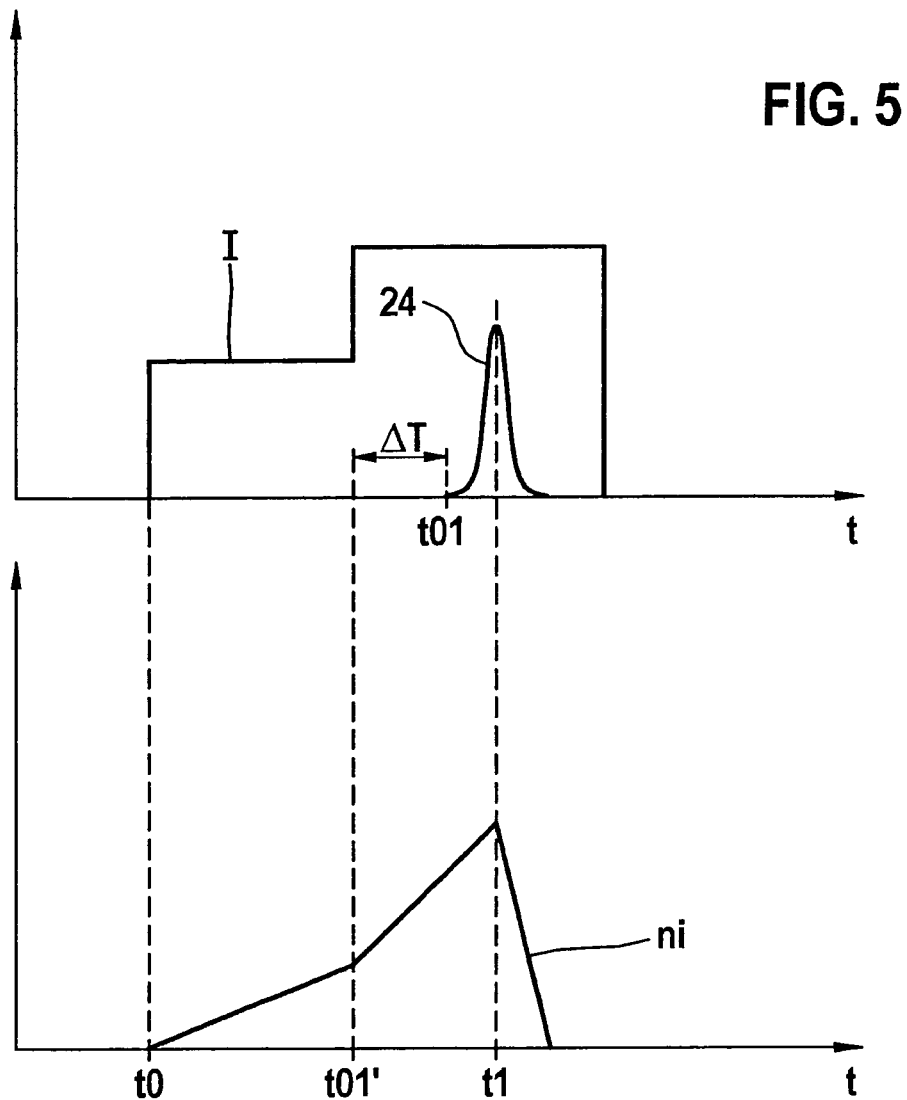
FIG. 5 shows the curve over time of operating variables of the laser device according to the present invention while using an additional example embodiment of the operating method according to the present invention.

One further example embodiment of the operating method according to the present invention, in which a nonconstant power density is selected for pumping light 60, will be described below, with reference to FIG. 5. As may be seen in FIG. 5, in a first time range t0 to t01', a relatively low value for the amplitude of control current I, and with that, also the power density of pumping light 60 (FIG. 2) is selected, which makes possible an increase in the service life of pumping light source 30 (FIG. 1), since the latter does not constantly have to emit at maximum power.

Only beginning at time t01' is a relatively large amplitude specified for control current I of control device 32, so that the change over time of inversion density ni does not fall below a specifiable threshold value beginning at time t01', and thus particularly also before the generation of laser pulse 24 beginning at time t01. This advantageously ensures that a variance of pumping duration t1-t0 is also minimized during the use of nonconstant power densities for the optical pumping.

What has proven of special importance for achieving the low variance of pumping duration t1-t0, is the setting of the minimum specifiable gradient of inversion density ni in time range T, directly before the generation of laser pulse 24.

One especially large operating range of ignition device 27 occurs when, within a specifiable time range, preferably during a single ignition process for a cylinder 12 (FIG. 1) of internal combustion engine 10, especially over a time duration of approximately ≤2 ms, a plurality of laser pulses 24 is generated using a pulse repetition rate of about 5 kHz.

According to one additional advantageous example embodiment of the operating method according to the present invention, a plurality of laser pulses 24 is generated, a repetition rate for acting on laser device 26 using pumping light 60 amounting to about 500 Hz, particularly about 100 Hz.

Besides the application of the operating method according to the present invention in laser-based ignition devices 27 for internal combustion engines, the use of the principle according to the present invention also comes into consideration for stationary engines, such as high capacity gas engines, or the like.

The power density to be used, according to the present invention, for pumping light 60 may be ascertained in a simple manner, within the scope of a control method, or in an application of ignition system 27.

What is claimed is:

1. A method for operating a laser device including a laser-active solid having a passive Q-switch, the method comprising:
   using a pumping light to act upon the laser device in such a way that a specified time curve of the inversion density is produced in the laser-active solid,
   wherein multiple Q-switched laser pulses are generated for an ignition device of an internal combustion engine,
   wherein a repetition rate for the action upon the laser device using the pumping light is less than or equal to approximately 500 Hz.

2. The method as recited in claim 1, wherein the pumping light acting upon the laser device has a constant power density during at least selected periods of acting upon the laser device.

3. The method as recited in claim 2, wherein the power density of the pumping light is selected so that a first Q-switched laser pulse is generated within a pumping duration that is less than or equal to approximately twice the fluorescence life of a material of the laser-active solid, wherein the pumping duration starts from a pumping start time corresponding to the beginning of the application of the pumping light.

4. The method as recited in claim 3, wherein the pumping light acting upon the laser device has a non-constant power density during at least selected periods of acting upon the laser device, and wherein the power density of the pumping light is selected so that a specified change over time of the inversion density results in the laser-active solid.

5. The method as recited in claim 4, wherein the power density of the pumping light is selected in such a way that, for a specified time period directly before the generation of a first Q-switched laser pulse, the change over time of the inversion density in the laser-active solid does not fall below a specified threshold value.

6. The method as recited in claim 3, wherein for each laser pulse the pumping duration is ascertained between the pumping start time and the time of the actual generation of the laser pulse, and wherein deviations of the pumping durations among different laser pulses are evaluated in order to change the application of pumping light onto the laser device.

7. The method as recited in claim 1, wherein the multiple laser pulses are generated within a specified time range of less than or equal to approximately 2 ms during an ignition process for a cylinder of the internal combustion engine, using a pulse repetition rate of greater than or equal to approximately 5 kHz.

8. A laser device, comprising:
a laser-active solid;
a passive Q-switch; and
a pumping light source generating a pumping light for acting upon the laser device, wherein the pumping light source is configured to act upon the laser device using the pumping light in such a way that a specified time curve of the inversion density results in the laser-active solid,
wherein multiple Q-switched laser pulses are generated for an ignition device of an internal combustion engine,
wherein a repetition rate for the action upon the laser device using the pumping light is less than or equal to approximately 500 Hz.

9. The laser device as recited in claim 8, wherein the pumping light source has a semiconductor diode laser.

10. The laser device as recited in claim 9, wherein the laser device is a part of the ignition device for the internal combustion engine.

* * * * *

UNITED STATES PATENT AND TRADEMARK OFFICE
CERTIFICATE OF CORRECTION

PATENT NO. : 8,656,879 B2
APPLICATION NO. : 12/736514
DATED : February 25, 2014
INVENTOR(S) : Heiko Ridderbusch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this
Twenty-ninth Day of September, 2015

Michelle K. Lee
*Director of the United States Patent and Trademark Office*